(12) United States Patent
Min et al.

(10) Patent No.: US 8,597,853 B2
(45) Date of Patent: Dec. 3, 2013

(54) ELECTRODE CATALYST FOR FUEL CELL, MEMBRANE-ELECTRODE ASSEMBLY FOR FUEL CELL INCLUDING SAME, AND FUEL CELL SYSTEM INCLUDING SAME

(75) Inventors: Myoung-Ki Min, Yongin-si (KR); Geun-Seok Chai, Yongin-si (KR); Hee-Tak Kim, Yongin-si (KR); Tae-Yoon Kim, Yongin-si (KR); Sang-Il Han, Yongin-si (KR); Kah-Young Song, Yongin-si (KR); Sung-Yong Cho, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 208 days.

(21) Appl. No.: 12/945,778

(22) Filed: Nov. 12, 2010

(65) Prior Publication Data

US 2011/0244363 A1     Oct. 6, 2011

(30) Foreign Application Priority Data

Apr. 5, 2010  (KR) .................. 10-2010-0030979

(51) Int. Cl.
*H01M 8/10*   (2006.01)

(52) U.S. Cl.
USPC ........... 429/483; 429/484; 429/523; 429/524; 429/525; 429/526; 429/527

(58) Field of Classification Search
USPC .......... 429/483, 484, 523, 524, 525, 526, 527
See application file for complete search history.

(56) References Cited

U.S. PATENT DOCUMENTS

2007/0148531 A1*  6/2007  Yoshizawa et al. ............. 429/44

FOREIGN PATENT DOCUMENTS

| JP | 2003-093874 A | 4/2003 |
| KR | 1020040054815 A | 6/2004 |
| KR | 10-2006-0004780 A | 1/2006 |
| KR | 10-2007-0045730 A | 5/2007 |
| KR | 10-2008-0039034 A | 5/2008 |
| KR | 10-2009-0052018 A | 5/2009 |

OTHER PUBLICATIONS

Korean Official Communication dated Nov. 30, 2012, 3 pages.
Notice of Allowance issued by the Korean Patent Office on Jul. 31, 2013 in Korean Patent Application No. 10-2010-0030979, corresponding to captioned U.S. Appl. No. 12/945,778.
Min, et al., "Novel preparation method of composite catalyst composed of Pt wires and particles for low-temperature fuel cell applications." Electrochimica Acta, 2010, vol. 55, pp. 737-742.

* cited by examiner

*Primary Examiner* — Jane Rhee
(74) *Attorney, Agent, or Firm* — Knobbe Martens Olson & Bear, LLP

(57) ABSTRACT

An electrode catalyst for a fuel cell including a carbon-based carrier and an active metal supported in the carrier, for example, an electrode catalyst for a fuel cell includes a carrier and an active metal supported in the carrier, wherein the electrode catalyst has an X value of 95 to 100% in Equation 1.

$X(\%) = (\text{XPS measurement value})/(\text{TGA measurement value}) \times 100$     [Equation 1]

wherein,
the XPS measurement value represents a quantitative amount of the active metal present on a surface of the electrode catalyst,
the TGA measurement value represents the XPS measurement value using a monochromated Al Kα-ray, which is the quantitative amount of total active metal supported in the catalyst.

12 Claims, 2 Drawing Sheets

ELECTRODE CATALYST FOR FUEL CELL, MEMBRANE-ELECTRODE ASSEMBLY FOR FUEL CELL INCLUDING SAME, AND FUEL CELL SYSTEM INCLUDING SAME

CROSS-REFERENCE TO RELATED APPLICATIONS

This application claims the benefit of Korean Patent Application No. 10-2010-0030979, filed on Apr. 5, 2010, in the Korean Intellectual Property Office, the disclosure of which is incorporated herein by reference.

BACKGROUND

1. Field

An aspect of the present invention relates to an electrode catalyst for a fuel cell, and a membrane-electrode assembly for a fuel cell and a fuel cell system including the same.

2. Description of the Related Technology

A fuel cell is a power generation system for producing electrical energy through an electrochemical redox reaction of an oxidant and hydrogen in a hydrocarbon-based material such as methanol, ethanol, natural gas, and the like.

Such a fuel cell is a clean energy source that can replace fossil fuels. The fuel cell includes a stack composed of unit cells, and has an advantage of producing various ranges of power. Since fuel cells have four to ten times higher energy density than a small lithium battery, fuel cells have been high-lighted as a small portable power source.

Typical examples of fuel cells are polymer electrolyte membrane fuel cells (PEMFC) and direct oxidation fuel cells (DOFC). A direct oxidation fuel cell that uses methanol as a fuel is called a direct methanol fuel cell (DMFC).

The polymer electrolyte fuel cell has an advantage of having high energy density and power, but also has the problems of requiring careful handling of the hydrogen gas and requiring accessory facilities such as a fuel reforming processor for reforming a fuel gas such as methane, methanol, and natural gas, in order to produce hydrogen.

On the contrary, the direct oxidation fuel cell has a lower energy density than that of the polymer electrolyte fuel cell, but has the advantage of easy handling of a liquid-type fuel, a low operation temperature, and no requirement for additional fuel reforming processors.

In the above fuel cell, the stack that actually generates electricity includes several to scores of unit cells stacked in multiple layers, and each unit cell is made up of a membrane-electrode assembly (MEA) and a separator (also referred to as a bipolar plate). The membrane-electrode assembly has an anode (referred to as a fuel electrode or an oxidation electrode) and a cathode (referred to as an air electrode or a reduction electrode) attached to each other with an electrolyte membrane therebetween.

A fuel is supplied to an anode and adsorbed on catalysts of the anode, and then the fuel is oxidized to produce protons and electrons. The electrons are transferred into a cathode via an external circuit, and the protons are transferred into the cathode through the polymer electrolyte membrane. In addition, an oxidant is supplied to the cathode. Then, the oxidant, protons, and electrons are reacted on catalysts of the cathode to produce electricity along with water.

SUMMARY OF CERTAIN INVENTIVE ASPECTS

One aspect of the present invention provides an electrode catalyst for a fuel cell having excellent catalyst utilization efficiency.

Another aspect of the present invention provides a membrane-electrode assembly for a fuel cell including the electrode catalyst for a fuel cell.

A further aspect of the present invention provides a fuel cell system including the membrane-electrode assembly.

According to one aspect of the present invention, an electrode catalyst for a fuel cell is provided that includes a carrier and an active metal supported in the carrier, wherein the catalyst satisfies the condition that X ranges from 95 to 100% in the following Equation 1.

$$X(\%) = (\text{XPS measurement value})/(\text{TGA measurement value}) \times 100 \quad [\text{Equation 1}]$$

In Equation 1, the XPS measurement value refers to the quantitative amount of active metal present in the surface of the catalyst, and the TGA measurement value, which is an XPS measurement value using a monochromated Al Kα-ray, refers to the quantitative amount of total active metal supported in the electrode catalyst.

The X may range from 98 to 100%.

The carrier may be a porous carbon-based carrier.

The carbon-based carrier may be selected from graphite, denka black, ketjen black, acetylene black, carbon nanotube, carbon nanofiber, carbon nanowire, carbon nanoballs, or activated carbon.

The active metal may be at least one catalyst selected from platinum, ruthenium, osmium, a platinum-ruthenium alloy, a platinum-osmium alloy, a platinum-palladium alloy, and a platinum-M alloy (M is at least one transition element selected from the group consisting of Ga, Ti, V, Cr, Mn, Fe, Co, Ni, Cu, Zn, Sn, Mo, W, Rh, and Ru).

The catalyst may include 10 to 95 wt % of the active metal.

The active metal may have a specific surface area of 10 to 400 $m^2/g$.

The catalyst may be fabricated in accordance with any method selected from the group consisting of irradiation, a polyol method, and a sub-substrate method.

The polyol method may be performed by providing an active metal and then adding a carrier.

According to another aspect of the present invention, a membrane-electrode assembly for a fuel cell is provided that includes a cathode and an anode facing each other, and a polymer electrolyte membrane interposed between the cathode and the anode, wherein at least one of the cathode and the anode includes the catalyst for a fuel cell.

According to another aspect of the present invention, a fuel cell system is provided that includes at least one electrical generator including at least one membrane-electrode assembly having an anode and a cathode facing each other and a polymer electrolyte membrane interposed between the anode and the cathode and a separator, a fuel supplier supplying a fuel to the electrical generator, and an oxidant supplier supplying an oxidant to the electrical generator, wherein at least one of the cathode and the anode includes the catalyst for a fuel cell.

The fuel cell system may be a low temperature fuel cell.

Thereby, it is possible to provide an electrode catalyst for a fuel cell having high utilization efficiency of the active material, and a membrane-electrode assembly and a fuel cell system including the electrode catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF CERTAIN INVENTIVE EMBODIMENTS

Figure 1:
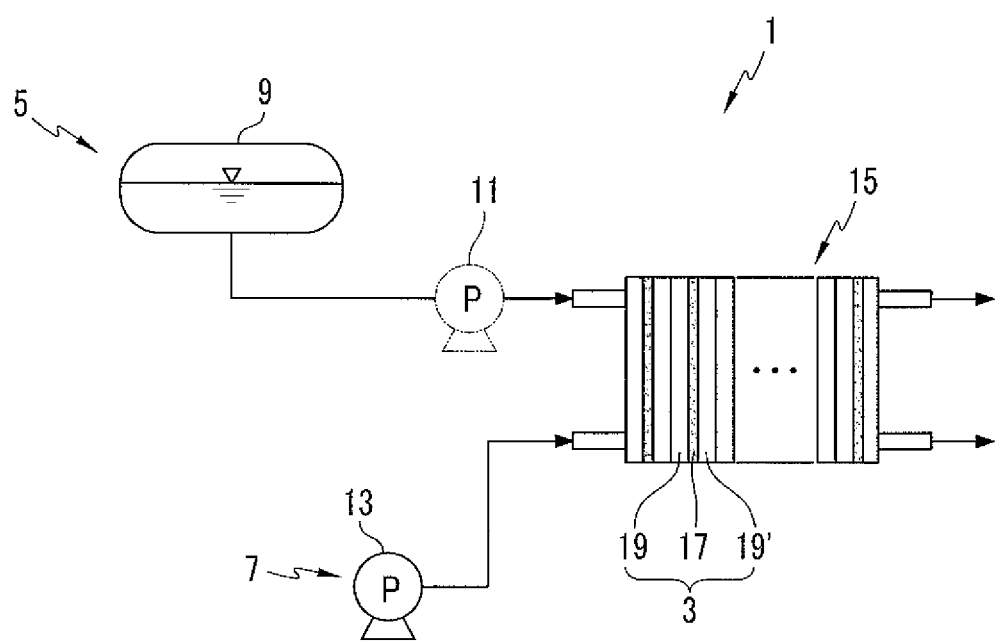
FIG. 1 is a schematic view showing a fuel cell system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Moreover, it is to be understood that where is stated herein that one film or layer is "formed on" or "disposed on" a second layer or film, the first layer or film may be formed or disposed directly on the second layer or film or there may be intervening layers or films between the first layer or film and the second layer or film. Further, as used herein, the term "formed on" is used with the same meaning as "located on" or "disposed on" and is not meant to be limiting regarding any particular fabrication process.

The electrode catalyst for a fuel cell according to an embodiment of the present invention is an electrode catalyst for a fuel cell including a carrier and an active metal supported in the carrier, wherein the electrode catalyst has a 95 to 100% XPS (X-ray photoelectron spectroscopy) measurement value measured in an Al Kα-ray with regard to a TGA (thermogravimetric analysis) measurement value.

The electrode catalyst for a fuel cell is generally fabricated by supporting an active metal such as platinum on a carrier. Accordingly, the catalyst activity is related to the specific surface area of the active metal, so research has have been performed to downsize the particle of catalyst metal to a nano-size in order to increase the specific surface area of the active metal.

On the other hand, even though the specific surface area of the active metal is increased, the electrode catalyst for a fuel cell having catalyst activity inside the porous carrier may not play a role during driving of the fuel cell when a part of metal components showing catalyst activity is enclosed inside the porous carrier. Therefore, the efficiency of utilizing the active metal is deteriorated.

However, the electrode catalyst for a fuel cell according to an aspect of the present invention includes an active metal supported in a carrier, and the ratio of the active metal existing on the surface of carrier is enhanced, so the active metal utilizing efficiency is improved.

It is estimated that the efficiency of utilizing an electrode catalyst for a fuel cell is enhanced as much as an increase in the ratio of the amount of active metal present on the surface of the carrier relative to the amount of total active metal included in the electrode catalyst. However, although the TGA analysis has been carried out in order to measure the amount of active metal included in the entire electrode catalyst for a fuel cell so far, a method of measuring a ratio of the active metal amount present on the carrier surface to the entire active metal amount has not been suggested.

Accordingly, it is possible to determine the efficiency of utilizing active metal of an electrode catalyst for a fuel cell through thermogravimetric analysis (TGA) and X-ray photoelectron spectroscopy (XPS) analysis.

The TGA analysis is generally used for measuring the supported amount of active metal of an electrode catalyst for a fuel cell, as mentioned above.

The carrier may include, for example, a carbon-based carrier, a carbon-based carrier with a polymer coating layer, a metal oxide carrier, an inorganic material carrier, or the like, but it is not limited thereto as long as it may be used for a carrier for a fuel cell. The polymer coating layer may be a conductive polymer such as polypyrrole, aniline or etc, and the polymer coating layer may be present in an amount of more than 0 wt % and about 10 wt % or less) based on the total amount of the carbon-based carrier with a polymer coating layer. The metal oxide carrier may be $TiO_2$, $RuO_2$, or a combination thereof. $TiO_2$ may be desirably used together with the carbon-based carrier in an amount of more than 0 wt % and about 7 wt % or less. The inorganic material carrier may be WC.

For example, the electrode catalyst for a fuel cell may include a carbon-based material as a carrier, so the approximate amount of supporting active metal may be determined by calculating the remaining amount of the supporting active metal after firing the carbon-based carrier in oxygen or air. The measured amount of active metal also includes the amount of metal particles that are enclosed in the useless closed space inside the carrier or inside of micropores of the carbon-based carrier. The remaining amount of active metal is defined as a supported amount of general metal nanoparticles.

On the other hand, the XPS analysis is an analyzing method mainly used for surface analysis. The XPS analysis is an analyzing method for analyzing photons generated when irradiating a monochromated Al Kα x-ray into a sample at 150 W to calculate an oxidation condition of the surface, a surface composition, a binding energy difference, and so on.

Since the XPS analyzes photons coming from the surface after irradiating the xray, it is possible to obtain exact information on the surface. Accordingly, it may be possible to determine the distribution amount of metal particles on the carrier surface of the electrode catalyst for a fuel cell using the XPS analysis. In addition, it may be possible to identify information not only regarding the surface of the catalyst particles but also to a predetermined depth from the surface if the conditions are changed. For example, it may be possible to collect the supported amount information of active metal present within 5 nm from the surface using the XPS analysis.

The efficiency of utilizing active metal of the electrode catalyst for a fuel cell may be represented by the following Equation 1.

$$X(\%) = (XPS\ measurement\ value)/(TGA\ measurement\ value) \times 100 \qquad [Equation\ 1]$$

Hereinafter, Equation 1 is illustrated, for example, when a carbon-based carrier is used in the electrode catalyst. In Equation 1, the XPS measurement value using a monochromated Al Kα-ray may provide quantitative information by dividing the area obtained by integrating the peaks of carbon species of similar energy bands to a C1s peak (BE: binding energy: 284.4 eV) of carbon used as a carrier by an atomic sensitivity factor (ASF). The quantitative data of active metal may be obtained by dividing the area obtained by integrating the area of the peak of the active metal (e.g., in a case of Pt, 4fBE=72.4 eV) by the ASF. From this data, the quantitative wt % of the active metal supported in the entire catalyst may be obtained. The quantitative wt % value is an XPS measurement value.

In addition, the TGA measurement value may be obtained when a certain amount of catalyst is heated in oxygen or air, the carbon is burned at a temperature higher than a certain temperature and only the active metal remains, and then the ratio of the remaining active metal to the initial catalyst weight (the weight of active metal calculated by subtracting oxygen weight since it is present as an oxide) is calculated to provide a wt % of the active metal.

The X (%) value is obtained by calculating the % ratio of two wt %.

The carrier may be a carbon-based carrier as above, and for example, it may be a porous carbon-based carrier. The carbon-based carrier may include a carbon-based material such as graphite, denka black, ketjen black, acetylene black, carbon nanotubes, carbon nanofiber, carbon nanowire, carbon nanoballs, activated carbon, or the like.

However, the carrier is not limited to the carbon-based material, and the carrier may include a carrier such as an inorganic material or the like. The TGA analysis may be performed in accordance with a sub-substrate method using silica. In this case, if the catalyst is synthesized, most silica is removed, and silica may remain at about 3% based on the entire catalyst. Since the silica is not considered as a carrier, the TGA value may be calculated by the wt % of the carrier except silica, and active metal.

The electrode catalyst for a fuel cell according to an embodiment of the present invention has an X value ranging from 95% to 100%. For example, the electrode catalyst for a fuel cell may have an X value ranging from 98% to 100%. Within the range, since the efficiency of utilizing active metal is enhanced compared to the case of using the same amount of active metal in a fuel cell, an amount of the high cost catalyst may be saved. In addition, as active metal is more exposed on the surface of the carrier, it is possible to beneficially affect the performance of a fuel cell.

The active metal may include any type of metal as long as it participates in the reaction of a fuel cell to be used as a catalyst. For example, the active metal may include a platinum-based active metal. The platinum-based active metal may include at least one catalyst selected from the group consisting of platinum, ruthenium, osmium, a platinum-ruthenium alloy, a platinum-osmium alloy, a platinum-palladium alloy, and a platinum-M alloy (M is at least one transition element selected from the group consisting of Ga, Ti, V, Cr, Mn, Fe, Co, Ni, Cu, Zn, Sn, Mo, W, Rh, and Ru).

The specific surface area of the active metal may depend on the average particle size of the active metal. For example, if the average particle size of the active metal is about 2 nm to 8 nm, the specific surface area (BET) of the active metal may be 30 to 200 $m^2/g$. Thus, the particle size of the active metal may be appropriately controlled in order to obtain the active metal of 10 to 400 $m^2/g$, particularly 20 to 200 $m^2/g$, and more particularly 30 to 200 $m^2/g$. When the particle size and the specific surface area of the active metal fall into the above range, the desired level of activity of the active metal may be obtained.

As stated above, the anode and cathode may include the same material, but the anode catalyst is preferably a platinum-ruthenium alloy catalyst in order to prevent the poisoning phenomenon due to CO generated during the anode reaction in a direct oxidation fuel cell. For example, the anode catalyst may include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

The specific surface area of carrier is measured by Brunauer, Emmett, Teller (BET) specific surface area analysis. The BET specific surface area analysis includes measuring specific surface area, total pore volume, pore distribution, or the like of a powder by adsorbing nitrogen gas on the powder surface and measuring the adsorbed nitrogen gas amount.

The electrode catalyst for a fuel cell according to an embodiment of the present invention is fabricated by reducing a precursor of an active metal including platinum or a platinum-based alloy into an active metal, then supporting the active metal in the surface of a carbon-based carrier. As described above, the method of manufacturing the electrode catalyst is not limited to the example described above as long as the active metal is prepared and then supported in a carbon-based carrier. Examples of methods of fabricating the electrode catalyst include irradiation, a polyol method, a sub-substrate method, and the like, but the active metal should be supported in a carrier after preparing the active metal.

According to another embodiment of the present invention, a membrane-electrode assembly for a fuel cell is provided that includes a cathode and an anode facing each other and a polymer electrolyte membrane interposed between the cathode and the anode, wherein the cathode includes a cathode substrate and a cathode catalyst layer, the anode includes an anode substrate and an anode catalyst layer, and at least one catalyst layer selected from the cathode catalyst layer and the anode catalyst layer includes the electrode catalyst for a fuel cell.

The catalyst layer may further include a hinder resin to improve its adherence and proton transfer properties.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain. Non-limiting examples of the proton conductive polymer include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. The proton conductive polymer is at least one selected from the group consisting of poly(perfluorosulfonic acid), poly(perfluorocarboxylic acid), a copolymer of tetrafluoroethylene and fluorovinylether having a sulfonic acid group, polyetherketone sulfide, aryl ketone, poly(2,2'-(m-phenylene)-5,5'-bibenzimidazole), and poly(2,5-benzimidazole).

The hydrogen (H) in the cation exchange group of the proton conductive polymer may be substituted with Na, K, Li, Cs, or tetrabutylammonium. When the H in the cation exchange group of the terminal end of the proton conductive polymer side chain is substituted with Na or tetrabutylammonium, NaOH or tetrabutyl ammonium hydroxide may be used during preparation of the catalyst composition, respectively. When the H is substituted with K, Li, or Cs, suitable compounds for the substitutions may be used. Since such a substitution is known to this art, a detailed description thereof is omitted. The proton conductive polymer substituted with Na, K, Li, Cs, or tetrabutyl ammonium may be resulfonated and changed to a proton type by a sulfuric acid treating process on a catalyst layer.

The binder resin may be used singularly or as a mixture. Optionally, the binder resin may be used along with a non-conductive polymer to improve adherence between a polymer electrolyte membrane and the catalyst layer. The amount of the binder resin may be adjusted to its usage purpose.

Non-limiting examples of the non-conductive polymer include polytetrafluoroethylene (PTFE), tetrafluoroethylenehexafluoropropylene copolymers (FEP), tetrafluoroethyleneperfluoro alkyl vinyl ether copolymers (PFA), ethylene/tetrafluoroethylene (ETFE), ethylenechlorotrifluoro-ethylene copolymers (ECTFE), polyvinylidene fluoride, polyvinylidene fluoride-hexafluoropropylene copolymers (PVdF-HFP), dodecyl benzenesulfonic acid, sorbitol, and combinations thereof.

The electrode substrates support the anode and cathode and provide a path for transferring the fuel and oxidant to catalyst layers. The electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrates may be treated with a fluorine-based resin to be water-repellent to prevent deterioration of diffusion efficiency due to water generated during operation of a fuel cell. Examples of the fluorine-based resin may include polytetrafluoroethylene, polyvinylidene fluoride, polyhexafluoropropylene, polyprefluoroan alkylvinylether, polyperfluorosulfonylfluoridealkoxyvinyl ether, fluorinated ethylene propylene, polychlorotrifluoroethylene, and copolymers thereof.

A microporous layer can be added between the aforementioned electrode substrates and catalyst layer to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nanocarbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the electrode substrate. The binder resin may include, but is not limited to, polytetrafluoroethylene, polyvinylidenefluoride, polyhexafluoropropylene, polyperfluoroan alkylvinylether, polyperfluorosulfonylfluoride, alkoxyvinyl ether, polyvinylalcohol, celluloseacetate, or copolymers thereof. The solvent includes water, alcohols such as ethanol, isopropyl alcohol, n-propylalcohol, and butanol, dimethyl acetamide, dimethylsulfoxide, Nmethylpyrrolidone, tetrahydrofuran, and so on. The coating method may include, but is not limited to, screen printing, spray coating, doctor blade methods, gravure coating, dip coating, silk screening, painting, and so on, depending on the viscosity of the composition.

According to a another embodiment of the present invention, a fuel cell system is provided that includes at least one electrical generator, a fuel supplier, and an oxidant supplier. The electrical generator includes a membrane-electrode assembly and a separator, the membrane-electrode assembly includes a cathode and an anode facing each other and a polymer electrolyte membrane interposed between the cathode and the anode, the cathode includes a cathode substrate and a cathode catalyst layer, the anode includes an anode substrate and an anode catalyst layer, at least one catalyst layer of the cathode catalyst layer and the anode catalyst layer includes a catalyst for a fuel cell, and the catalyst for a fuel cell includes the catalyst for a fuel cell according to one of the embodiments described above.

The fuel cell system may be a low temperature fuel cell. Examples of low temperature fuel cell include a phosphoric acid-type fuel cell (PAFC), a solid polymer-type fuel cell (PEMFC), a direct methanol-type fuel cell (DMFC), an alkali-type fuel cell (AFC), and the like.

The electrical generator plays a role of generating electricity through oxidation of a fuel and reduction of an oxidant.

The fuel supplier plays a role of supplying the electrical generator with a fuel including hydrogen, and the oxidant supplier plays a role of supplying the electrical generator with an oxidant. The oxidant includes oxygen or air.

The fuel includes liquid or gaseous hydrogen, or a hydrocarbon-based fuel such as methanol, ethanol, propanol, butanol, and natural gas.

FIG. 1 shows a schematic structure of a fuel cell system according to an embodiment of the present invention, which will be described in detail with reference to this accompanying drawing as follows. FIG. 1 shows a fuel cell system supplying a fuel and an oxidizing agent to an electrical generating element using a pump, but the fuel cell system illustrated in FIG. 1 is not limited to such structures. The fuel cell system of FIG. 1 may alternately include a structure wherein a fuel and an oxidant are provided in a diffusion manner.

A fuel system 1 includes at least one electricity generating element 3 that generates electrical energy by oxidation of a fuel and reduction of an oxidizing agent, a fuel supplier 5 for supplying the fuel, and an oxidant supplier 7 for supplying an oxidant to the electricity generating element 3.

In addition, the fuel supplier 5 is equipped with a tank 9, which stores fuel, and a fuel pump 11, which is connected therewith. The fuel pump 11 supplies fuel that is stored in the tank 9 with a predetermined pumping power.

The oxidant supplier 7, which supplies the electricity generating element 3 with an oxidant, is equipped with at least one oxidant pump 13 for supplying an oxidant with a predetermined pumping power.

The electricity generating element 3 includes a membrane-electrode assembly 17, which oxidizes hydrogen or a fuel and reduces an oxidant, and separators 19 and 19' that are respectively positioned at opposite sides of the membrane-electrode assembly and that supply hydrogen or a fuel, and an oxidant, respectively. The stack 15 is provided by stacking at least one electricity generating element 3.

Hereinafter, several embodiments are illustrated in more detail with reference to following examples. However, it is understood that the embodiments are not limited by these examples.

A person having ordinary skills in this art can sufficiently understand parts of the disclosure that are not described.

EXAMPLES

Irradiation Method

Example 1

2.5 g of a platinum-based metal precursor of chloroplatinic acid ($H_2PtCl_6$, 40 wt %) and 1.85 g of a commercial carbon carrier of ketjen black were introduced and mixed in 400 ml of an isopropyl alcohol dispersing agent solvent and distilled water. The mixture was introduced into a reactor and irradiated with an electron beam (2 MeV, 1 mA) while agitating for 10 minutes to reduce the platinum-based metal precursor. The reduced platinum metal was filtered and dried to provide a Pt/C catalyst for a fuel cell so that the active metal is to be supported at 35 wt %. In the obtained catalyst, the amount of platinum metal was about 32.3 wt % according to the TGA analysis results, and the relative value of platinum was 31.9 wt % based on the catalyst weight according to the results of calculating the peak of carbon and platinum through an XPS test. The obtained catalyst had a specific surface are of about 127 m² g.

Example 2

A catalyst for a fuel cell was fabricated in accordance with the same procedure as in Example 1, except that the active metal was to be supported at 45 wt %. In the obtained catalyst, the amount of platinum metal was about 43.5 wt % according to the TGA analysis results, and the relative value of platinum was 43.0 wt % based on the catalyst weight according to the results of calculating the peak of carbon and platinum through an XPS test. The obtained catalyst had a specific surface are of about 112 m²/g.

Example 3

A catalyst for a fuel cell was fabricated in accordance with the same procedure as in Example 1, except that the active metal was to be supported at 50 wt %. The carbon carrier used in Example 3 was a carbon obtained by heating the commercial carbon of ketjen black at 1400° C. under a helium atmosphere, so it had a lower surface area of 400 m²/g but higher crystallinity. From the TGA analysis results, the platinum amount in the obtained catalyst was about 46.3 wt %. From the results of calculating the peak of carbon and platinum in the XPS test, the relative value of platinum was 45.9 wt % based on the weight of the catalyst. The obtained catalyst had a specific surface are of about 99.9 m²/g.

Example 4

2.5 g of a platinum-based precursor of chloroplatinic acid ($H_2PtCl_6$, 40 wt %), 0.48 g of a cobalt-based precursor of $CoSO_4$, and 1.5 g of a commercial carbon supporter of ketjen black were introduced and mixed in 400 ml of a dispersing agent solvent and distilled water. The alloy catalyst was fabricated to provide a ratio of platinum and cobalt of 3:1 (atomic ratio). The mixture was introduced into a reactor and irradiated with an electron beam (2 MeV, 1 mA) while agitating for 10 minutes to provide a platinum/cobalt-based alloy active metal. The reduced platinum/cobalt-based alloy was filtered and dried to provide a supported amount of metal of 40 wt %, so as to provide a PtCo/C catalyst for a fuel cell. From the TGA analysis results, the platinum metal amount was about 39.1 wt % in the obtained catalyst, and from the results of calculating the peak of carbon and platinum through the XPS test, the relative value of platinum was 38.4 wt % based on the catalyst weight. The obtained catalyst had a specific surface are of about 87.4 m²/g.

Example 5

A catalyst for a fuel cell was fabricated in accordance with the same procedure as in Example 4, except that ketjen black used in Example 3 was heated at 1400° C. to provide a carbon carrier. From the TGA analysis results, the platinum metal amount was about 39.7 wt % in the obtained catalyst, and from the results of calculating the peak of carbon and platinum through the XPS test, the relative value of platinum was 39.4 wt % based on the catalyst weight. The obtained catalyst had a specific surface are of about 87.4 m²/g.

Example 6

A catalyst for a fuel cell was fabricated in accordance with the same procedure as in Example 4, except that an active metal of PtCo/C was to be supported at 50 wt %. From the TGA analysis results, the platinum metal amount was about 47.8 wt % in the obtained catalyst, and from the results of calculating the peak of carbon and platinum through the XPS test, the relative value of platinum was 47.2 wt % based on the catalyst weight. The obtained catalyst had a specific surface are of about 84.8 m²/g.

Polyol Method

Example 7

2.5 g of a platinum-based metal precursor of chloroplatinic acid ($H_2PtCl_6$, 40 wt %) was introduced into 400 ml of an ethylene glycol (EG) solvent and distilled water. The pH of the mixture was adjusted at room temperature of 25° C. using 10% ammonia to 11 and it was refluxed for 2 hours while agitating to reduce the platinum-based metal precursor. 1 g of commercial carbon carrier of ketjen black was inputted in a reduced mixture and the pH was adjusted to 4 at room temperature using $(NH_3)_2SO_4$ and agitated for 10 hours to provide a Pt/C catalyst for a fuel cell supported at 50 wt %. The reduced and supported Pt/C catalyst was filtered and dried to provide a catalyst. From the TGA analysis results, the platinum metal amount was about 47.2 wt % in the obtained catalyst, and from the results of calculating the peak of carbon and platinum through the XPS test, the relative value of platinum was 46.7 wt % based on the catalyst weight. The obtained catalyst had a specific surface are of about 99.9 m²/g.

Sub-Substrate Method

Example 8

2.5 g of a platinum-based metal precursor of chloroplatinic acid ($H_2PtCl_6$, 40 wt %) was dissolved in 20 ml of distilled water and added to a carrier in which 1 g of ketjen black was uniformly mixed with 4 g of an auxiliary carrier of silica (surface area of 380 m²/g) in accordance with an incipient wetness method to impregnate all the precursor solution. The mixture was subjected to ultrasonic treatment until dried in an ultrasonic bath and heated under a 10% hydrogen atmosphere at 200° C. for 2 hours to provide a Pt/C catalyst. The obtained catalyst was put into 500 ml of a 1M NaOH solution and agitated for 5 hours to remove the auxiliary carrier of silica. It provided a Pt/C catalyst including about 3% of silica through the drying process after filtering. From the TGA analysis results, the platinum metal amount was about 48.0 wt % in the obtained catalyst, and from the results of calculating the peak of carbon and platinum through the XPS test, the relative value of platinum was 47.8 wt % based on the catalyst weight. At this time, since the silica is not considered as a carrier, the TGA value was calculated by the wt % of Pt and the carrier except silica. The obtained catalyst had a specific surface are of about 107.6 m²/g.

COMPARATIVE EXAMPLES

Comparative Example 1

Commercial Pt/C catalyst of TEC10E50E (manufactured by Tanaka) was used. From the TGA analysis results, the platinum metal amount was about 47.7 wt % in the obtained electrode catalyst, and from the results of calculating the peak of carbon and platinum through the XPS test, the relative value of platinum was 45.2 wt % based on the electrode catalyst weight. The catalyst had a specific surface are of about 99.9 m²/g.

Comparative Example 2

A Pt/C catalyst was fabricated in accordance with the same polyol method as in Example 7. However, the carbon carrier of ketjen black was introduced together with the metal precursor during the incipient polyol method instead of the order of preparing the metal particles and then inputting the carbon carrier of ketjen black. From the TGA analysis results, the platinum metal amount was about 47.0 wt % in the obtained electrode catalyst, and from the results of calculating the peak of carbon and platinum through the XPS test, the relative value of platinum was 43.2 wt % based on the electrode catalyst weight. The obtained catalyst had a specific surface are of about 99.9 m$^2$/g.

Comparative Example 3

A PtCo/C catalyst was manufactured in accordance with the same polyol method as in Example 7. However, the cobalt precursor was introduced at an atomic ratio of Pt:Co=3:1, and the cobalt precursor was introduced together with the metal precursor during the incipient polyol method instead of the order of preparing the metal particles and then inputting the carbon carrier of ketjen black. From the TGA analysis results, the platinum metal amount was about 47.7 wt % in the obtained catalyst, and from the results of calculating the peak of carbon and platinum through the XPS test, the relative value of platinum was 44.6 wt % based on the catalyst weight. The obtained catalyst had a specific surface are of about 79.9 m$^2$/g.

Experimental Example

TGA Measurement Method

The catalyst samples obtained from Examples 1 to 3 and Comparative Example 1 were subjected to TGA measurement using a TGA measurer (Thermal Gravimetric Analysis, TGA2050. DSC2910.RCS, TA Instruments) under an oxygen gas atmosphere and heating condition of a heating speed of 10° C./min from 23° C. to 600° C. Under the condition that the platinum and metal nano-particles became an oxide metal at 100%, it is considered that the remaining amount of the carrier of ketjen black that was fired was the supported amount of active metal in the catalyst.

XPS Measuring Method

XPS measurement was performed using an X-ray photoelectron spectrophotometer (AXIS-NOVA) manufactured by Kratos. The measurement conditions were as follows:
  model: AXIS-NOVA (Kratos)
  X-ray source: Monochromated Al Kα 150 W
  lens mode: XPS (X-ray Photoelectron Spectroscopy)
  base Pressure: 3.6×10$^{-9}$ Torr
  resolution (Pass Energy): 20 eV
  scan step: 0.05 eV/step
  surface treatment: as received
  charge neutralizer: Off Each electrode catalyst for a fuel cell obtained from Examples 1 to 8 and Comparative Examples 1 to 3 was measured to determine XPS using the XPS device mentioned above, and the results are shown in the following Table 1 and in FIG. 2.

Figure 2:
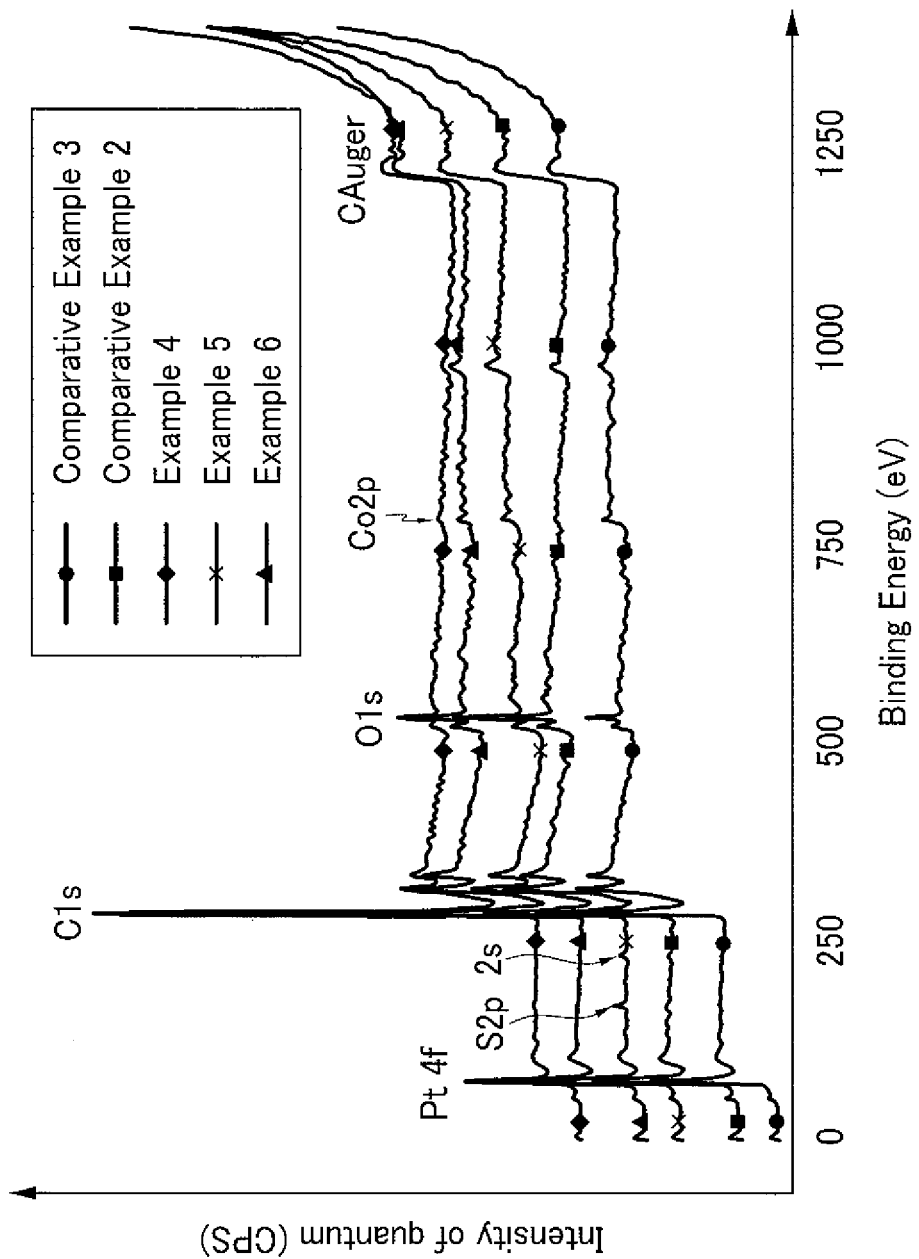
FIG. 2 shows data of an X-ray photoelectron spectroscopy (XPS) curve of an alloy catalyst.

FIG. 2 is data showing XPS curves of the synthesized catalysts, and respectively shows information of analyzing Pt/Co/C synthesized by a chemical method and PtCo/C catalyst synthesized by an irradiation method. In the graph, Pt4f, C1s, and the Co2p energy band were scanned several times to provide more exact peaks. The peaks were calculated to separate oxide species, and thereby it is possible to quantitatively calculate the ratio that each atom is present.

In the graph of FIG. 2, the horizontal axis indicates the binding energy (unit: eV), and the vertical axis indicates the count per second (cps) referring to the intensity of the quantum. Referring to FIG. 2, peaks of certain atoms in the binding energy ranges of Pt4f, C1s, and Co2p were confirmed. Then it was calculated by inputting binding energy of an appropriate chemical species and integrating the region of separated peaks to find the quantitative information of the certain chemical species. Particularly, comparing the results corresponding to Examples 4 to 6 to the results corresponding to Comparative Examples 2 and 3, Pt of alloy catalysts obtained from the examples were more enclosed in the surface of the catalyst. The XPS results are summarized in Table 1.

The results of measuring TGA and XPS of catalysts obtained from Examples 1 to 8 and Comparative Examples 1 to 3 are shown in the following Table 1.

TABLE 1

| | Catalyst | | | XPS | | | | |
|---|---|---|---|---|---|---|---|---|
| | Kind | Target supporting amount | Manufacturing method | atom % | | | measurement result | TGA result | XPS/TGA ratio |
| | | | | C 1s | Co 2p | Pt 4f | Pt wt % | | |
| Example 1 | Pt/C | 35 wt % | irradiation | 97.2 | — | 2.8 | 31.9 | 32.3 | 98.8 |
| Example 2 | Pt/C | 45 wt % | irradiation | 95.6 | — | 4.4 | 43.0 | 43.5 | 98.9 |
| Example 3 | Pt/1400 | 50 wt % | irradiation | 95.0 | — | 5.0 | 45.9 | 46.3 | 99.1 |
| Example 4 | PtCo/C | 40 wt % | irradiation | 94.9 | 1.3 | 3.9 | 38.4 | 39.1 | 98.2 |
| Example 5 | PtCo/C 1400 | 40 wt % | irradiation | 94.7 | 1.3 | 4.0 | 39.4 | 39.7 | 99.2 |
| Example 6 | PtCo/C | 50 wt % | irradiation | 97.0 | 2.5 | 6.0 | 47.2 | 47.8 | 98.7 |
| Example 7 | Pt/C | 50 wt % | polyol | 96.3 | — | 5.2 | 46.7 | 47.2 | 98.9 |
| Example 8 | Pt/C | 50 wt % | sub-substrate | 95.7 | — | 5.4 | 47.8 | 48.0 | 99.6 |
| Comparative Example 1 | Pt/C | 50 wt % | chemical method | 95.2 | — | 4.8 | 45.2 | 47.7 | 94.8 |
| Comparative Example 2 | Pt/C | 50 wt % | polyol | 93.9 | — | 4.4 | 43.2 | 47.0 | 91.9 |
| Comparative Example 3 | PtCo/C | 50 wt % | polyol | 95.3 | 1.2 | 5.0 | 44.6 | 47.7 | 93.5 |

Referring to Table 1, examples in which the method of synthesizing a catalyst or synthesizing order is defined increase the active metal exposed on the surface of the catalyst compared to the comparative examples that are obtained by the generally known method of synthesizing a catalyst in the chemical method, which indicates more catalysts may participate in the catalyst reaction. Accordingly, it may be confirmed that the catalyst according to the embodiment of the present invention has high efficiency of utilizing the catalyst.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode catalyst for a fuel cell, comprising:
a carrier, and
an active metal having a specific surface area of 10 to 400 m$^2$/g supported in the carrier, wherein the electrode catalyst has an X value of 95 to 100% in Equation 1:

$$X(\%) = (\text{X-ray photoelectron spectroscopy (XPS) measurement value})/(\text{thermogravimetric analysis (TGA) measurement value}) \times 100 \quad [\text{Equation 1}]$$

wherein,
the XPS measurement value represents a quantitative amount of the active metal present on a surface of the electrode catalyst, and
the TGA measurement value represents the XPS measurement value using a monochromated Al Kα-ray, which is the quantitative amount of total active metal supported on the electrode catalyst.

2. The electrode catalyst of claim 1, wherein the X value ranges from 98 to 100%.

3. The electrode catalyst of claim 1, wherein the carrier is a carbon-based carrier.

4. The electrode catalyst of claim 1, wherein the carrier is a porous carbon-based carrier.

5. The electrode catalyst of claim 3, wherein the carbon-based carrier is selected from graphite, denka black, ketjen black, acetylene black, carbon nanotubes, carbon nanofiber, carbon nanowire, carbon nanoballs, or activated carbon.

6. The electrode catalyst of claim 1, wherein the active metal is selected from at least one catalyst selected from platinum, ruthenium, osmium, a platinum-ruthenium alloy, a platinum-osmium alloy, a platinum-palladium alloy, and a platinum-M alloy (M is at least one transition element selected from the group consisting of Ga, Ti, V, Cr, Mn, Fe, Co, Ni, Cu, Zn, Sn, Mo, W, Rh, and Ru).

7. The electrode catalyst of claim 1, wherein the electrode catalyst comprises 10 to 95 wt % of the active metal.

8. The electrode catalyst of claim 1, wherein the electrode catalyst is fabricated in accordance with at least one method selected from the group consisting of irradiation, a polyol method, and a sub-substrate method.

9. The electrode catalyst of claim 8, wherein the polyol method comprises preparing an active metal and then adding a carrier.

10. A membrane-electrode assembly for a fuel cell, comprising:
a cathode and an anode facing each other; and
a polymer electrolyte membrane interposed between the cathode and the anode,
wherein at least one of the cathode and the anode comprises the electrode catalyst for a fuel cell of claim 1.

11. A fuel cell system comprising:
at least one electrical generator comprising at least one membrane-electrode assembly comprising an anode and a cathode disposed to face each other and a polymer electrolyte membrane disposed between the anode and the cathode and a separator;
a fuel supplier supplying a fuel to the electrical generator; and
an oxidant supplier supplying an oxidant to the electrical generator,
wherein at least one of the cathode and the anode comprises the electrode catalyst for a fuel cell of claim 1.

12. The fuel cell system of claim 11, wherein the fuel cell system is a low temperature fuel cell.

* * * * *